(12) United States Patent
Lin et al.

(10) Patent No.: US 7,029,197 B2
(45) Date of Patent: Apr. 18, 2006

(54) QUICK-RELEASE JOINT FOR TWO TUBES

(76) Inventors: Jong-Te Lin, No. 40, Lane 103, Chungshan 3 Rd., Keelung (TW); Nelson Lin, 1F, No. 48, Lane 106 Paochien Rd., Chungho City, Taipei Hsien (TW)

( * ) Notice: Subject to any disclaimer, the term of this patent is extended or adjusted under 35 U.S.C. 154(b) by 91 days.

(21) Appl. No.: 10/693,343

(22) Filed: Oct. 24, 2003

(65) Prior Publication Data

US 2005/0089362 A1   Apr. 28, 2005

(51) Int. Cl.
*F16D 1/00* (2006.01)
(52) U.S. Cl. ............... 403/353; 403/102; 403/314; 285/70
(58) Field of Classification Search .......... 403/75, 403/84, 101, 102, 146, 295, 321, 322, 339, 403/340, 61, DIG. 8, 322.1, 322.2, 322.4, 403/331, 353, 80; 280/202, 204, 230, 231, 280/239; 135/126, 135; 473/476, 478, 415, 473/477, 490–495; 16/331; 285/65, 70, 285/312, 325, 326
See application file for complete search history.

(56) References Cited

U.S. PATENT DOCUMENTS

| | | | | |
|---|---|---|---|---|
| 3,187,373 A | * | 6/1965 | Fisher | 16/324 |
| 4,111,217 A | * | 9/1978 | Victor | 135/114 |
| 4,286,353 A | * | 9/1981 | Roche | 16/341 |
| 4,518,277 A | * | 5/1985 | Bush et al. | 403/102 |
| 4,895,386 A | * | 1/1990 | Hellestam et al. | 280/287 |
| 5,195,551 A | * | 3/1993 | Ju | 135/126 |
| 5,681,045 A | * | 10/1997 | Liao | 273/400 |
| 5,685,660 A | * | 11/1997 | Liao | 403/102 |
| 6,082,753 A | * | 7/2000 | Kotlier | 280/204 |
| 6,629,900 B1 | * | 10/2003 | Wu | 473/478 |
| 6,679,643 B1 | * | 1/2004 | Ham | 403/102 |

* cited by examiner

*Primary Examiner*—Robert J. Sandy
*Assistant Examiner*—Ruth C. Rodriguez
(74) *Attorney, Agent, or Firm*—Rabin & Berdo, PC

(57) ABSTRACT

A quick-release joint for two tubes which includes a first connector having a first inner lip formed on an inner surface of the first connector, a second connector pivotally connected to the first connector and axially offset from the first connector. The second connector has a protrusion formed on an inner surface of the second connector and has an outer groove formed on the protrusion next to a top face of the second connector to correspond to the first flange. A retainer is formed on a side of the first connector and the second connector to move the first connector to axially align with the second connector such that after the first inner lip is received in the outer groove of the protrusion, the first connector and second connector are solidly and rigidly coupled.

10 Claims, 7 Drawing Sheets

QUICK-RELEASE JOINT FOR TWO TUBES

BACKGROUND OF THE INVENTION

1. Field of the Invention

The present invention relates to a quick-release joint, and more particularly to a quick-release joint for coupling two tubes so the tubes can be separated or folded for storage in a more compact space.

2. Description of Related Art

A conventional quick-release joint for combining two tubes includes a first coupler securely engaged with a first tube, a second coupler securely engaged with a second tube and connected to the first coupler by a hinge mechanism, and a fastener selectively engaged with both the first and second couplers to secure the engagement between the first coupler and the second coupler. The fastener includes a bolt and a cover having a through hole to allow the bolt to extend therethrough. The cover has a first side engaging with the first coupler and a second side engaging with the second coupler such that after the cover engages with both the first and second couplers, the bolt threadingly extends through the through hole to secure the engagement of the cover to the first and second couplers. Thereafter the first tube and the second tube are securely connected with each other via the joint. However, when reviewing the engagement of the cover with both the first coupler and the second coupler, it is noted that the engagement between the first coupler and the second coupler merely depends on the cover and hinge so that after a period of time continuously bearing the force of maintaining the engagement between the first coupler and the second coupler, the fastener easily breaks or there will be misalignment or loose engagement between the first tube and the second tube due to the wear of the fastener.

To overcome the shortcomings of the conventional joint, the present invention intends to provide an improved quick-release joint to mitigate and obviate the aforementioned problems.

SUMMARY OF THE INVENTION

The primary objective of the present invention is to provide an improved quick-release joint for two tubes. The joint includes a first connector, a second connector axially offset from the first connector, and a retainer engaged with both the first and second connector to axially align the first connector with the second connector so that the first connector securely couples to the second connector, which in turn securely couples the first tube to the second tube.

In order to accomplish the aforementioned objective, the first connector has a protrusion with an outer groove, and the second connector has an internal lip to correspond to the groove on the first connector's protrusion. When the first connector engages with the second connector, the protrusion is received in the second connector with the lip away from the groove. After the retainer pushes the first connector to align with the second connector, engagement between the lip and the groove secures the engagement between the first connector and the second connector, which in turn secures engagement between the first tube and the second tube.

Other objects, advantages and novel features of the invention will become more apparent from the following detailed description when taken in conjunction with the accompanying drawings.

DETAILED DESCRIPTION OF THE PREFERRED EMBODIMENT

Figure 1:
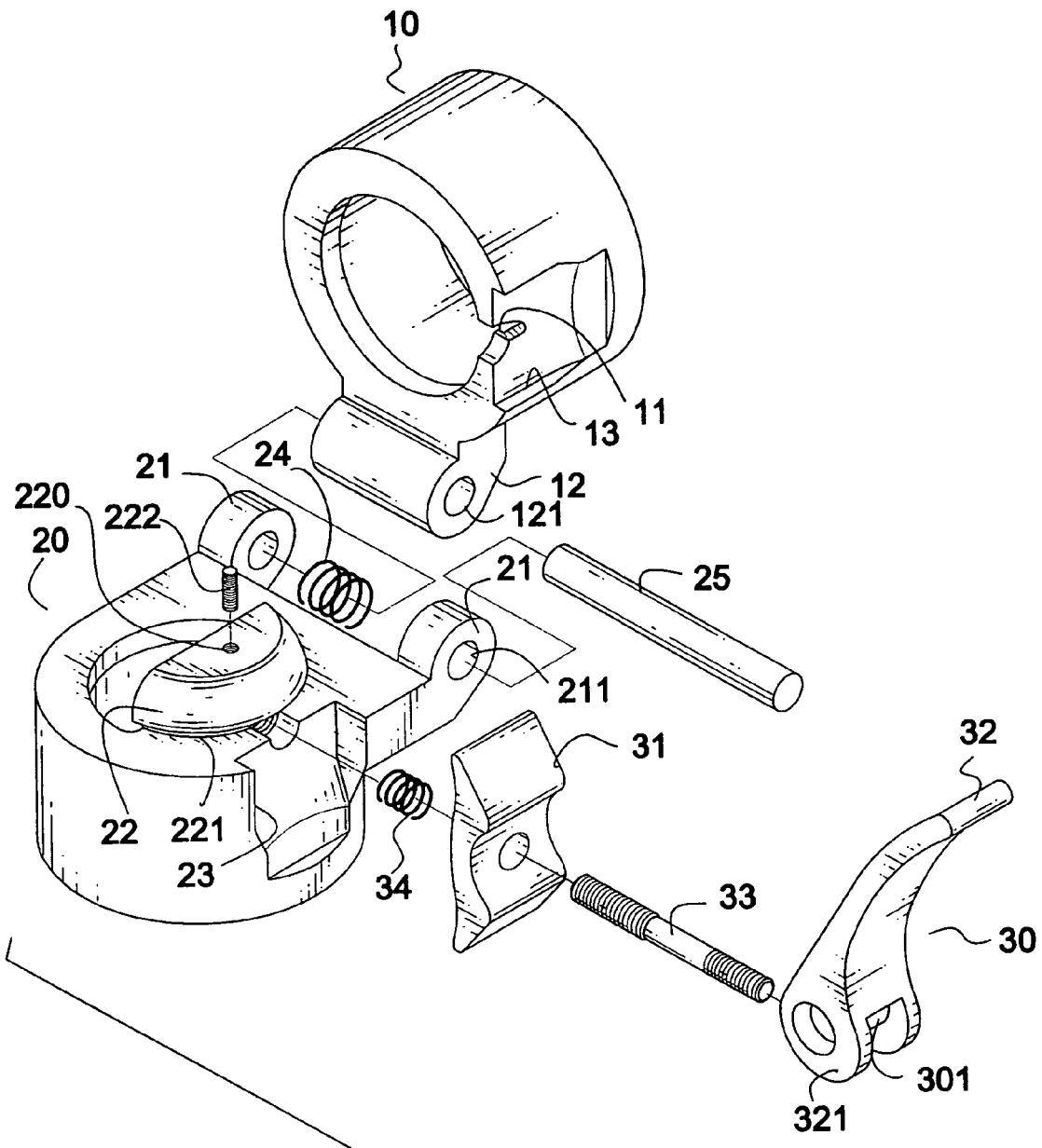
FIG. 1 is an exploded perspective view of the quick-release joint of the present invention.

With reference to FIG. 1, the quick-release joint in accordance with the present invention has a first connector (10), a second connector (20) and a retainer (30).

The first connector (10) is adapted to securely connect to a first tube (not shown) and the second connector (20) is adapted to securely connect to a second tube (not shown). The purpose of the first connector (10) and the second connector (20) is to couple the first tube and the second tube in a strong, rigid manner.

The first connector (10) is a tubular object and has an internal lip (11) formed on an inner surface of the first connector (10) and a sleeve (12) formed on a side surface of the first connector (10). The sleeve (12) has a through-hole (121) on a common axis with the through-holes (211) on ears (21) of the second connector (20). Preferably, the internal lip (11) is inclined with respect to an inner face of the first connector (10). A first recessed area (13) is defined in an outer surface of the first connector (10).

The second connector (20) is also a tubular object and has a pair of ears (21) extending out from an outer surface of the second connector (20) and a protrusion (22) formed on an inner surface of the second connector (20) and having a securing hole (220) defined through the protrusion (22) to communicate with an inside of the second connector (20) so as to allow a securing element (222), preferably a pin, to extend therethrough, an outer groove (221) formed on the protrusion (22) next to a top surface of the second connector (20). Preferably, the outer groove (221) has an opposite face inclined with respect to the top surface of the second connector (20) resulting in the bottom of the groove being narrower than the top. Each of the ears (21) has a through-hole (211) with a common axis. A second recessed area (23) is formed on the outer surface of the second connector (20) to correspond to the first recessed area (13) of the first connector (10). The distance between the two ears (21) is larger than the combination of the length of the sleeve (12) and the length of the compressed first spring (24). A first spring (24) is provided between the two ears (21) and a securing element (25) is provided to correspond to the through-holes (211) on the ears (21) and the through-holes (121) on the sleeve (12).

The retainer (30) includes a push (31), a handle (32) with an offset rotating axle (301), and a bolt (33) rotatably received in the offset rotating axle (301) and extending out of the handle (32) and having two threaded ends. A second spring (34) is provided between the inner face of the push (31) and the second recessed area (23).

When the quick-release joint of the present invention is in assembly, the securing element (25) extends through the through-hole (211) of one ear (21), the sleeve (12), the first spring (24) and into the through-hole (211) of the other ear (21) and then the securing element (25) is securely positioned between the two ears (21). As mentioned earlier the distance between the two ears (21) is larger than the length of the sleeve (12) plus the length of the compressed first spring (24) so that after the sleeve (12) is secured between the two ears (21) by the securing element (25), the sleeve (12) is pushed by the first spring (24) and thus held against one of the ears (21).

The bolt (33) then extends from the inner surface of the second connector (20), through the second spring (34), the push (31) and into the handle's (32) rotating axle (301). After the bolt (33) threads into the rotating axle (301), the handle (32) is secured to the bolt (33) and is rotatable with respect to the bolt (33) and rotating axle (301). Then, the securing element (222) extends into the securing hole (220) to abut an outer periphery of the bolt (33), preventing the bolt (33) from rotating, to secure the position of the bolt (33) inside the second connector (20).

Figure 2:
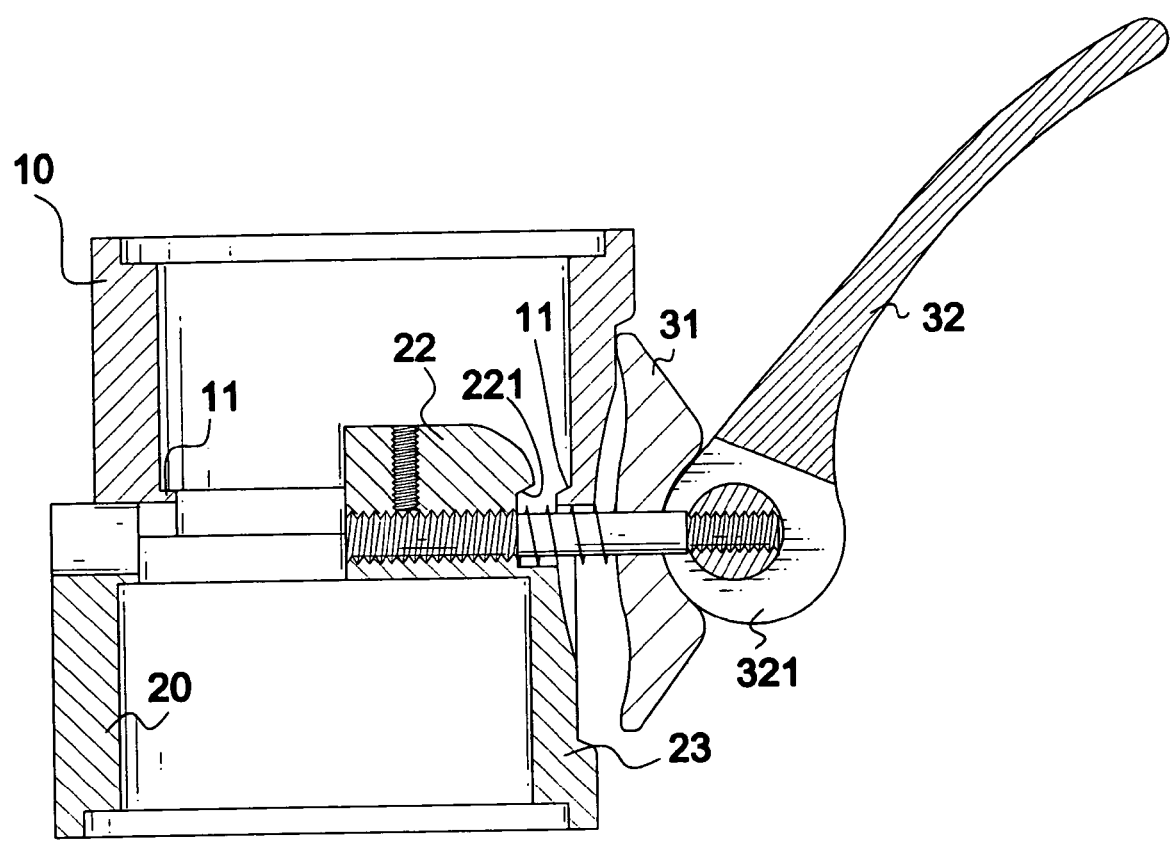
FIG. 2 is a schematic view showing the quick-release joint before alignment between the first connector and the second connector.

After the assembly of the quick-release joint of the present invention, it is seen from FIG. 2 that the first connector (10) is axially offset from the second connector (20) due to the force of the first spring (24) acting on both the sleeve (12) and on one ear (21). However, the protrusion (22) extends into the first connector (10). It is further noted that the push (31) has an arcuate shape and is received in the second recessed area (23) of the second connector (20) and the first recessed area (13) of the first connector (10). The arcuate shape push has a convex surface engaging with a bottom face defining the recessed area (13). The handle (32) has an offset rotating axle (321) resulting in a cam action on the head, engaging with a concave surface on the push (31).

Figure 3:
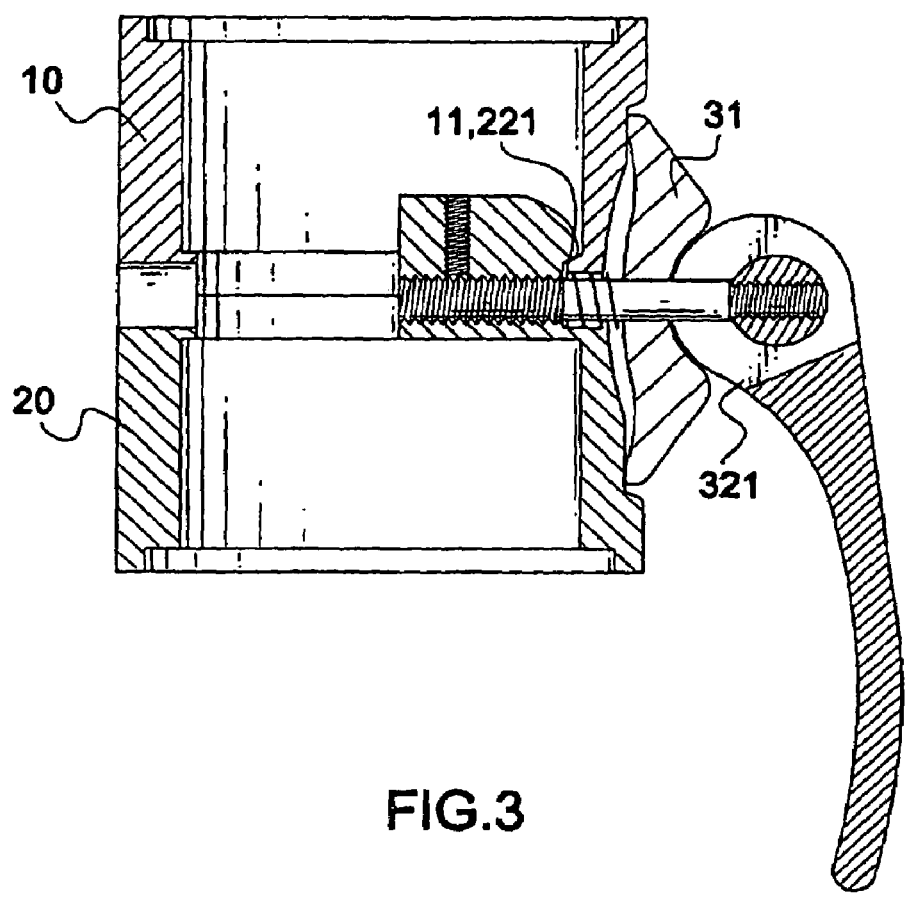
FIG. 3 is a schematic view showing the quick-release joint after alignment between the first connector and the second connector.

With reference to FIG. 3, when the handle (32) is rotated to the closed position, the cammed head (321) pushes the concave surface of the push (31) and thus the convex surface of the push (31) moves the first connector (10). The movement of the first connector (10) axially aligns it with the second connector (20), which allows the internal lip (11) to be received in the outer groove (221) of the protrusion (22). As a result of the movement of the first connector (10), the convex surface of the push (31) engages with both the bottom surface defining the second recessed area (23) and the bottom surface defining the first recessed area (13). When the first connector (10) is moved by the push (31), the first spring (24) and the second spring (34) are compressed such that when the handle (32) is rotated to the open position, the force stored in the first spring (24) and the second spring (34) returns the first connector (10) and the handle (32) respectively. After the first spring (24) returns the first connector (10), the first connector (10) is once again axially offset from the second connector (20). That is, when the first tube and the second tube are securely coupled to each other, the first connector (10) and the second connector (20) are axially aligned with one another due to the engagement between the internal lip (11) and the outer groove (221). As a result of the engagement between the internal lip (11) and the outer groove (221), the first connector (10) and the second connector (20) are secured to each other. Again, because the engaging force between the first and second connectors (10,20) depends on the internal lip (11) and the outer groove (221), the retainer (30) bears no part of any forces exerted on the first connector (10) and second connector (20) by the tubes (not shown). As a result, even after a long period of time continuously using the quick-release joint of the present invention, the retainer (30) will not wear or deform, and the connection between the first connector (10) and the second connector (20) remains rigidly secured.

Figure 4:
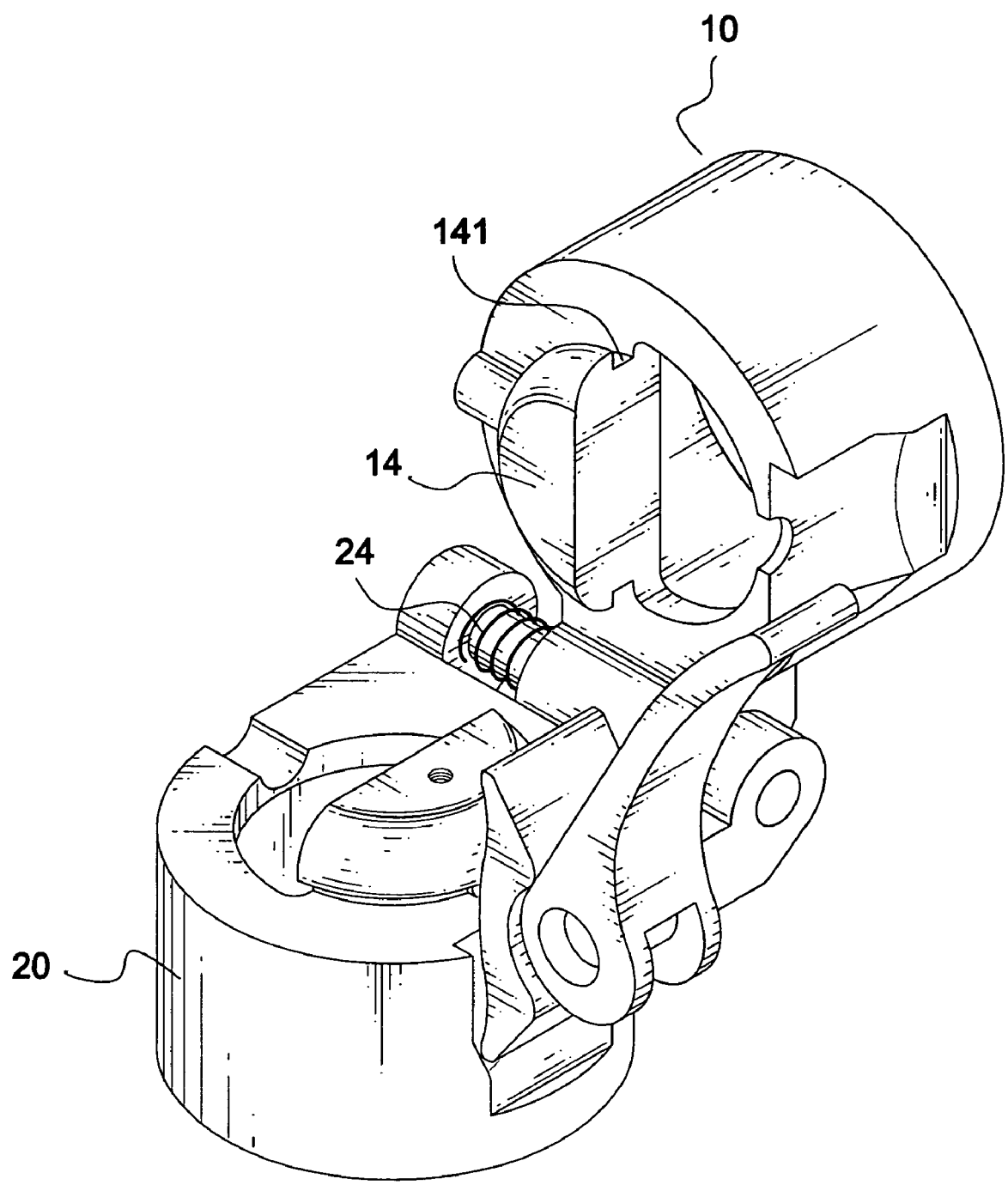
FIG. 4 is a perspective view of a second embodiment of the quick-release joint of the present invention.
Figure 5:
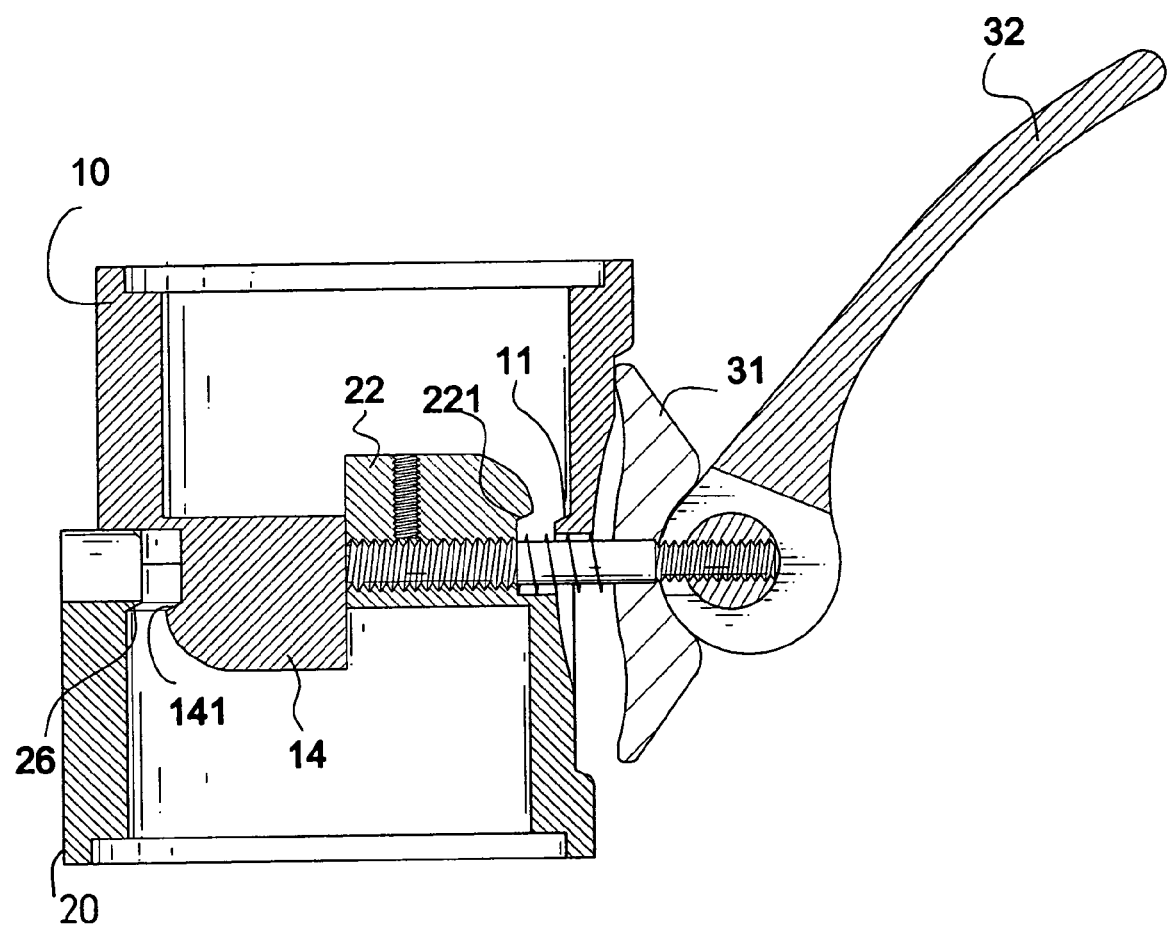
FIG. 5 is a schematic view showing the quick-release joint in FIG. 4 before alignment between the first connector and the second connector.
Figure 6:
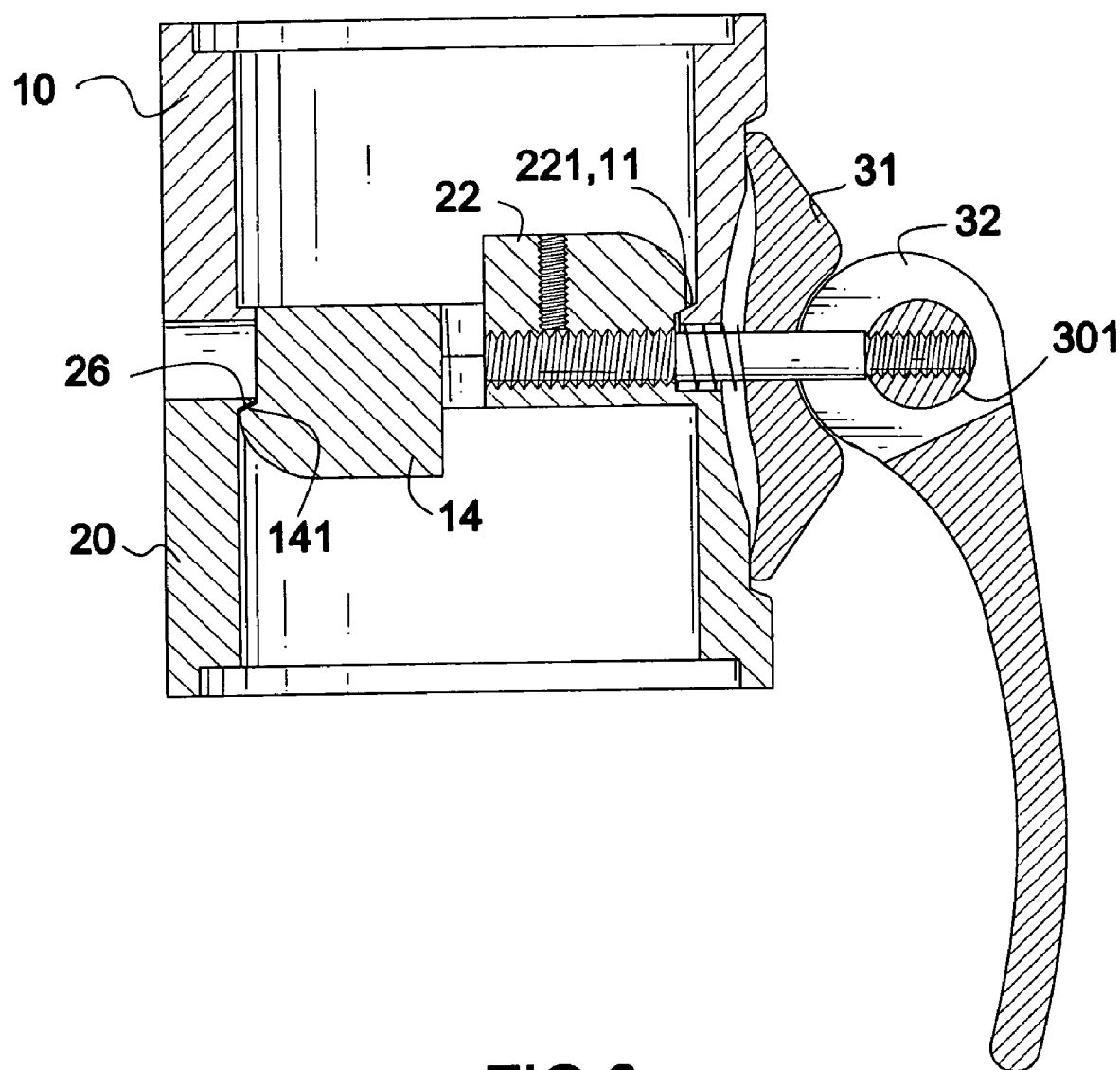
FIG. 6 is a schematic view showing the quick-release joint in FIG. 4 after alignment between the first connector and the second connector.

With reference to FIGS. 4, 5 and 6, the second embodiment of the present invention is shown, wherein most structural relationship in this embodiment is the same as that disclosed in the first embodiment. The only difference lies in that the first connector (10) has an extension (14) integrally formed on an inner surface of the first connector (10) and having a second outer groove (141) along a joint between the extension (14) and the inner surface of the first connector (10). The second connector (20) has, in addition to the protrusion (22) on the inner surface of the second connector (20), a second internal lip (26) formed on the inner surface of the second connector (20) to correspond to the second outer groove (141) of the first connector (10).

Therefore, after the assembly of the second embodiment of the quick-release joint, the extension (14) extends into the second connector (20) and the protrusion (22) extends into the first connector (10) while the first connector (10) is axially offset from the second connector (20). After the rotation of the handle (32) to move the push (31), the convex surface of the push (31) pushes the first connector (10) to axially align with the second connector (20) and also to compress the first spring (24) and second spring (34). Thus, the engagement between the second outer groove (141) and the second internal lip (26) and the engagement between the internal lip (11) and the outer groove (221) secure the connection between the first connector (10) and the second connector (20).

Figure 7:
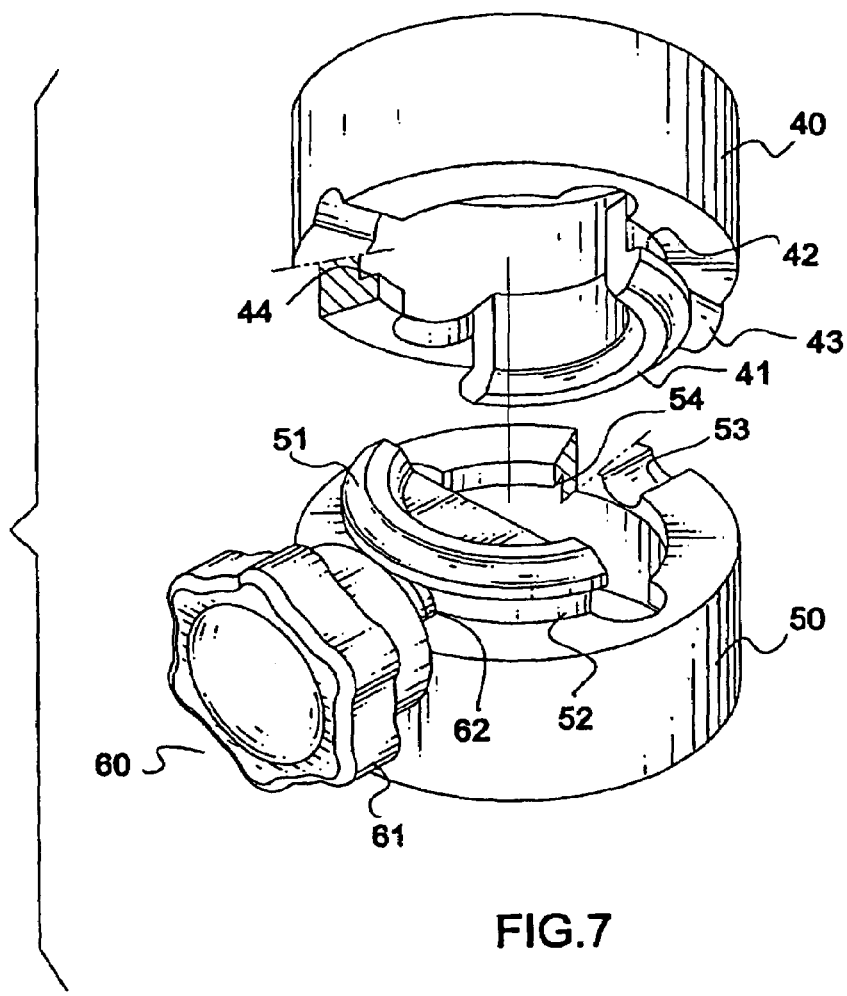
FIG. 7 is an exploded perspective view showing a third embodiment of the retainer of the quick-release joint of the present invention.

With reference to FIG. 7, it is noted that the present invention includes a first connector (40), a second connector (50) and a push (60).

The first connector (40) is a hollow cylinder and has a first protrusion (41) formed and extending from a portion of an inner periphery of the first connector (40), a first groove (42) defined at a joint of the first protrusion (41) and the inner periphery of the first connector (40), a guide (43) formed on an outer face of the first protrusion (41) and securely engaged with the bottom face of the first connector (40) and a first passage (44) defined in the inner periphery of the first connector (40).

The second connector (50) is also a hollow cylinder and has a second protrusion (51) formed and extending upward from a portion of an inner face of the second connector (50), a second groove (52) defined at a joint of the second protrusion (51) and the inner face of the second connector (50) to correspond to the first passage (44), a guiding notch (53) defined in a bottom face of the second connector (50) to correspond to the guide (43) and a second passage (54) defined in the inner face of the second connector (50) to correspond to the first groove (42) of the first connector (40).

The push (60) includes a knob (61) and a bolt (62) having a first distal end securely connected to the knob (61) and a second distal end extending into the second protrusion (51) from an outer periphery of the second protrusion (51).

After the first protrusion (41) is extended into the second connector (50) where an open space is defined without the formation of the second protrusion (51), the knob (61) is rotated to further extend the bolt (62) into the second connector (50) so that the second distal end of the bolt (62)

abuts an outer periphery of the first connector (40) to push the mating between the first groove (42) and the second passage (54) and the mating between the second groove (52) and the first passage (44). In order to ensure the mating between the first groove (42) and the second passage (54) and the mating between the second groove (52) and the first passage (44), the guide (43) is moved along the guiding notch (53). Whereby the first tube (not shown) securely connected to the first connector (40) and the second tube (not shown) securely connected to the second connector (50) are combined.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A quick-release joint for two tubes, the quick-release joint comprising:
    a hollow cylindrical first connector adapted to securely connect to a first tube, the first connector having an inner lip formed on an inner surface of the first connector;
    a hollow cylindrical second connector adapted to securely connect to a second tube, wherein the second connector is pivotally connected to the first connector, so that the second connector is pivotal, relative to the first connector, about a pivot axis, and is slidable along the pivot axis so as to be movable to a position axially offset from the first connector, the second connector has a protrusion formed on an inner surface of the second connector and having an outer groove formed on the protrusion next to the top surface of the second connector to correspond to the inner lip; and
    a retainer formed on a side of the first connector and the second connector to move the first connector to axially align with the second connector such that the inner lip is received in the outer groove of the protrusion to secure connection between the first connector and the second connector.

2. The A quick-release joint for two tubes, the quick-release joint comprising:
    a hollow cylindrical first connector adapted to securely connect to a first tube, the first connector having an inner lip formed on an inner surface of the first connector;
    a hollow cylindrical second connector adapted to securely connect to a second tube, wherein the second connector is pivotally connected to the first connector and is axially offset from the first connector, the second connector has a protrusion formed on an inner surface of the second connector and having an outer groove formed on the protrusion next to the top surface of the second connector to correspond to the inner lip; and
    a retainer formed on a side of the first connector and the second connector to move the first connector to axially align with the second connector such that the inner lip is received in the outer groove of the protrusion to secure connection between the first connector and the second connector,
    wherein the first connector has a sleeve formed on a side of the first connector, the second connector has a pair of ears separated from each other by a distance larger than a length of the sleeve so that the sleeve is slidable between the pair of ears.

3. The quick-release joint as claimed in claim 2 further comprising a pin extending through the sleeve and the pair of ears to secure the sleeve between the pair of ears and a first spring mounted around the pin and sandwiched between the sleeve and one of the ears to urge the first connector to be axially offset from the second connector.

4. The quick-release joint as claimed in claim 1, wherein the retainer comprises a push securely engaged with an outer side surface of the first connector, a bolt with a first distal end extending into the second connector to securely connect to an inner surface of the second connector and a handle rotatable relative to the push and having a second distal end of the bolt rotatably received by a rotating axle inside the handle, the handle having an eccentric cammed head selectively engaging with a concave outer surface of the push so as to push the first connector to axially align with the second connector.

5. The quick-release joint as claimed in claim 3, wherein the retainer comprises a push securely engaged with an outer side surface of the first connector, a bolt with a first distal end extending into the second connector to securely connect to an inner surface of the second connector and a handle rotatable relative to the push and having a second distal end of the bolt rotatably received inside the handle, the handle having an elliptical head selectively engaging with an outer surface of the push so as to push the first connector to align with the second connector.

6. The quick-release joint as claimed in claim 5, wherein the retainer further has a second spring sandwiched between an outer surface of the second connector and an inner surface of the push to provide a recovery force to the push and handle after the elliptical head of the handle engages with the outer surface of the push.

7. The quick-release joint as claimed in claim 6, wherein the first connector has a recessed area formed on the outer surface of the first connector to receive therein one portion of the push and the second connector has another recessed area formed on an outer surface of the second connector to receive therein the other one portion of the push.

8. The quick-release joint as claimed in claim 7, wherein the outer surface of the push is concave and the inner surface of the push is convex.

9. In a quick-release joint for two tubes, the quick-release joint having:
    a first connector adapted to securely connect to a first tube, the first connector having a first inner lip formed on an inner surface of the first connector;
    a second connector adapted to securely connect to a second tube, wherein the second connector is pivotally connected to the first connector, so that the second connector is pivotal, relative to the first connector, about a pivot axis, and is slidable along the pivot axis so as to be movable to a position axially offset from the first connector, the second connector has a protrusion formed on an inner surface of the second connector and having an outer groove formed on the protrusion next to a top face of the second connector to correspond to the first inner lip; and
    a retainer formed on a side of the first connector and the second connector to move the first connector to align with the second connector such that the first inner lip is received in the outer groove of the protrusion to secure connection between the first connector and the second connector, wherein the retainer includes a first arm, a second arm, a cylindrical connector and a threaded bolt, wherein the first arm is securely connected to an outer surface of the first connector and has a tubular connector integrally formed with the first arm, the second arm is securely connected to an outer surface of the second connector, the threaded bolt extends through the cylindrical connector to be ready to abut an inner surface of the second connector, whereby before the extension of the threaded bolt, the first connector is mis-aligned with the second connector, after the threaded bolt threadingly extends further into the cylindrical connector to abut the inner surface of the second connector, the second connector is moved by the extension of the threaded bolt to axially align with the first connector.

10. The quick-release joint as claimed in claim 1, wherein the retainer exerts a force in a direction parallel to the pivot axis, to move the first connector to axially align with the second connector.

\* \* \* \* \*